May 9, 1961 — L. E. PHILIPPS — 2,983,903

CRYSTAL VIBRATED REED AND RECEIVER AND SYSTEM OF COMMUNICATION USING SAME

Filed Nov. 13, 1956 — 3 Sheets-Sheet 1

INVENTOR.

LOUIS E. PHILIPPS

BY

Hyde, Meyer, Baldwin & Doran

ATTORNEYS

INVENTOR.
LOUIS E. PHILIPPS
BY
Hyde, Meyer, Baldwin & Doran
ATTORNEYS

May 9, 1961 L. E. PHILIPPS 2,983,903

CRYSTAL VIBRATED REED AND RECEIVER AND SYSTEM OF COMMUNICATION USING SAME

Filed Nov. 13, 1956 3 Sheets-Sheet 3

INVENTOR.

LOUIS E. PHILIPPS

BY

Hyde, Meyer, Baldwin & Doran

ATTORNEYS 2,983,903

CRYSTAL VIBRATED REED AND RECEIVER AND SYSTEM OF COMMUNICATION USING SAME

Louis E. Philipps, Thomaston, N.Y., assignor to The Philipps Electronics Corporation, Cleveland, Ohio, a corporation of Ohio Filed Nov. 13, 1956, Ser. No. 621,641

6 Claims. (Cl. 340—156)

This invention relates to reeds vibrated by laminated piezoelectric crystals, one use of which is in individual portable receivers in an improved personal signalling system, and another use as switching means in a relay circuit.

An object of the present invention is to provide a combined laminated piezoelectric crystal device with a tuned reed effect either built into the crystal or utilizing a reed rigidly attached thereto, said crystal device causing said vibrating reed effect upon receipt of a predetermined frequency signal which is selectively resonant to said reed.

Another object of the present invention is to provide an individual receiver unit employing a tuned reed effect which is driven by a laminated piezoelectric crystal device and strikes directly upon a sounding cone to produce an audible signal upon receipt by said crystal device of an audio-frequency signal selectively resonant to said reed.

Another object of this invention is to provide individual portable receiver units, each of which has two or more reeds tuned to different frequencies wherein vibration of said reeds is caused by vibration of a laminated piezoelectric crystal which receives and vibrates in response to audio-frequency signals and causes the reed to actuate signal means, as by striking a sounding cone to produce an audible signal.

Another object of the present invention is to provide an individual receiver using a laminated piezoelectric crystal having a power requirement of only about 16 micro-watts for driving a tuned reed which strikes a sounding cone to produce an audible signal.

Another object of the present invention is to provide individual receivers, each of which has two or more reeds tuned to different audio-frequencies for action in series, wherein the second of said reeds cannot vibrate until the first has been caused to vibrate and thereby enable a disabling means which previously prevented said second reed from vibrating.

Another object of this invention is to provide novel crystal pick-up means responsive to waves of audio-frequency and adapted to vibrate reeds or other devices corresponding in frequency to the frequency of said signals and thereby to cause other operations to occur.

Still another object of the present invention relates to a signalling system wherein the area to be covered with the signal is encompassed by a wire loop, both ends of which are connected to an audio amplifier. Then, a high audio-frequency, preferably between 5,000 and 20,000 cycles per second, is pulsed into the wire loop and radiated magnetically into the air. My invention includes a receiver adapted to receive such a pulse signal and to cause a tuned vibrating device to mechanically vibrate and directly strike a cone to produce an audible signal or to otherwise cause a desirable control result.

Another object of the present invention is to provide a novel piezoelectric crystal vibrated reed and communication receiver characterized by its structural simplicity, the ease of assembly of its parts, its strong and sturdy nature and its low manufacturing cost. Other features of this invention reside in the arrangement and design of the parts for carrying out their appropriate functions.

Other objects and advantages of this invention will be apparent from the accompanying drawings and the following description, and the essential features will be set forth in the appended claims.

The present invention has many uses but is here shown in Figs. 1 to 4 as intended for use in a communication system which consists of a central broadcasting unit comprising an audio-frequency generator or transmitter and a plurality of small receivers of the present invention which may be easily carried in the pocket of persons on call. The transmitter in one form of the invention sends out a single audio-frequency signal on a radio-frequency carrier wave, or preferably two or more audio-frequency signals in sequence on a radio-frequency carrier wave. Each receiver is equipped with a flexible laminated piezoelectric crystal which vibrates in response to receipt of a wide range of audio-frequency signals. The piezoelectric crystal provides, or is associated with, suitable tuned reeds which are each resonant at a selected audio-frequency, and, where two or more reeds are used, they may be so interlocked as to vibrate in one sequence only and thereby produce an audible signal readily noticed by the person carrying the particular receiver.

Figure 1:
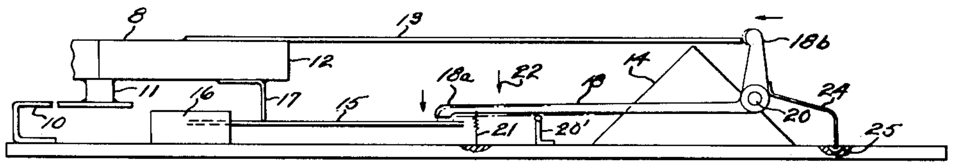
Fig. 1 is a side elevational view of a piezoelectric crystal vibrated reed device having a plurality of reeds and designed for sequential operation of the reeds.
Figure 2:
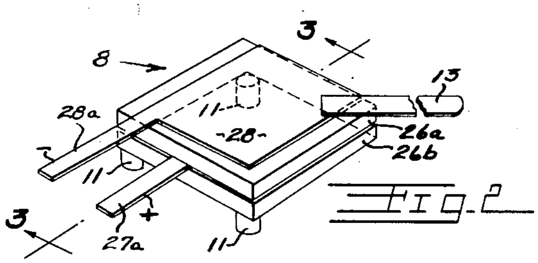
Fig. 2 is a perspective view of the piezoelectric crystal constructed in accordance with the present invention and shown associated with a tuned reed adapted to strike a sounding cone during vibration.
Figure 3:
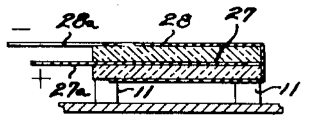
Fig. 3 is a vertical sectional view taken along the plane of line 3—3 of Fig. 2.

In Fig. 1, a laminated piezoelectric crystal 8 constructed according to Fig. 2, which will be described later, is utilized in a two-reed receiver. The crystal 8 is generally constructed with four sides, three corners of which are rigidly mounted on a base plate 9 by means of securing legs 11 (as best seen in Fig. 2) and bracket 10, leaving the fourth corner 12 free to vibrate. A tuned reed 13 is rigidly connected to the free corner 12 and projects outwardly over a sounding cone 14. A small air gap or space is provided between the apex of the cone and reed 13. A second tuned reed 15 is firmly held in a block 16 supported on the base plate 9. The reed 15 is positioned below the piezoelectric crystal 8 and extends outwardly substantially parallel to and in alignment vertically beneath the reed 13. A rigid arm 17 is secured to the bottom surface of the free corner 12 of crystal 8 and projects downwardly to engage the reed 15. An L-shaped lever 18 is pivotally mounted on a fixed pivot 20 and has one end 18*a* normally spring biased into close proximity to reed 15 as shown in dot-dash lines in Fig. 1, and limited by fixed stop 20′, by means of a hair spring 21 which normally acts in the direction of the arrow 22. The other end 18*b* of lever 18 is normally lightly urged by the spring to its dot-dash position wherein it touches the free end of reed 13. A very slight touch of the end 18*a* of lever 18 upon reed 13 will prevent the reed from vibrating. A suitable dampening device is provided for the lever 18 and includes a stiff wire 24 which extends into a recess 25 at one end while its other end is rigidly secured to an upstanding leg portion of the L-shaped lever 18. The recess 25 is filled with silicone or a like viscous fluid which acts as a dash-pot and is effective in causing the lever 18 to be moved very slowly since the lever and its connecting parts are all constructed of extremely small light-weight parts.

The device of Fig. 1 is designed for use in a receiver responsive to two audio-frequency signals transmitted in sequence. It will be understood that each of the reeds 13 and 15 is selectively resonant to a respective one of said audio-frequency signals. A first signal of the resonant frequency of reed 15 is received by the piezoelectric crystal 8 and causes the crystal to vibrate. The vibrations of the crystal 8 are transmitted to the reed 15 by arm 17. The reed 15, being selectively resonant to this particular signal, begins to vibrate and causes the end 18*a* of lever 18 to move upwardly into the full line position where the other end 18*b* of the lever clears the end of reed 13. It requires a second or two for the reed 15 to work the lever into this position due to dash-pot 25. When the piezoelectric crystal no longer receives the first audio-frequency signal, it ceases to vibrate and in turn causes reed 15 to stop vibrating. The dash-pot effect of wire 24 in the dash-pot recess 25 causes the lever 18 to take about three seconds or longer to return to the dot-dash position. Meanwhile, if during the period while the lever 18 is disengaged from reed 13, a second audio-frequency signal is received by the piezoelectric crystal 8 and having the resonant frequency of reed 13, then reed 13 will be caused to vibrate. During vibration, the end of the reed 13 directly strikes or engages the sounding cone 14 and gives a characteristic tone or humanly recognizable signal. The power requirement here is only about 16 micro-watts, which is much less than for magnetic devices of similar character. It is to be understood that I do not wish to limit myself to any particular number of reeds, since any feasible number may be employed, each interlocked with the next in series so that a predetermined sequence of signals is required to operate them all. The prime advantage gained by increasing the number of vibrating reeds is found in an increased number of combinations of different signals that may be sent out from the transmitting equipment, thereby permitting an increase in the number of persons subject to individual call.

In Fig. 2, I have shown the detailed construction of a type of piezoelectric crystal suitable for use in the device shown in Fig. 1. The crystal is in two laminations or layers 26*a* and 26*b*, which when cemented together and a voltage applied thereto, causes the plates to deform in opposite directions, producing a twisting or bending action similar to that of bi-metallic thermostat strips. The laminated sections are made of Rochelle salt (sodium potassium tartrate). The Rochelle salt laminations may be cut so that their crystals extend at an angle to one another in a known manner so that when three corners of a four-cornered crystal are held solid by legs 11, the fourth corner tends to move up and down in tune with the audio-frequency signal applied to the crystal. This crystal is sold under the name "Twister Bimorph" by Brush Electronics Company. I may also use a "Bender Bimorph" crystal made by the same company, merely by changing the mounting so as to utilize its bending action. A sheet of foil is applied between the upper face of the bottom crystal layer 26*b* and the lower face of the top crystal layer 26*a* when the laminated sections of the crystal are assembled, to form a central layer of foil 27. A tab 27*a* leads out from this central sheet of foil to form an electrical contact. After the laminated crystal layers are cemented together, as viewed in Fig. 2, a second sheet of foil 28 is attached to the upper surface of the top crystal layer 26*a* and then folded around one end of the crystal and extended across the lower face of the bottom crystal layer 26*b*. This outermost layer of foil is also provided with a tab 28*a*, one of the tabs usually being connected to an electrical conductor while the other is connected to a ground to complete a circuit, as hereinafter described in Fig. 4. A tuned reed 13 is rigidly connected to the fourth or free corner of the crystal and is caused to vibrate upon the crystal receiving an audio-frequency signal having the resonant frequency of the reed. The piezoelectric crystal assembly is in essence a mechanical transformer which multiplies the effective motion of the individual plates as much as ten to one hundred times for a given voltage. Likewise, it multiplies voltage-producing stresses, for a given twisting or bending motion. At certain frequencies, depending on physical dimensions, the piezoelectric elements act as sharply tuned electrical circuits. When properly constructed, the crystals respond perfectly to resonant frequencies independent of temperature. Conventional tuned circuits employing inductors and capacitors of practical size cannot compete with the crystals for sharpness of tuning and stability.

Figure 4:
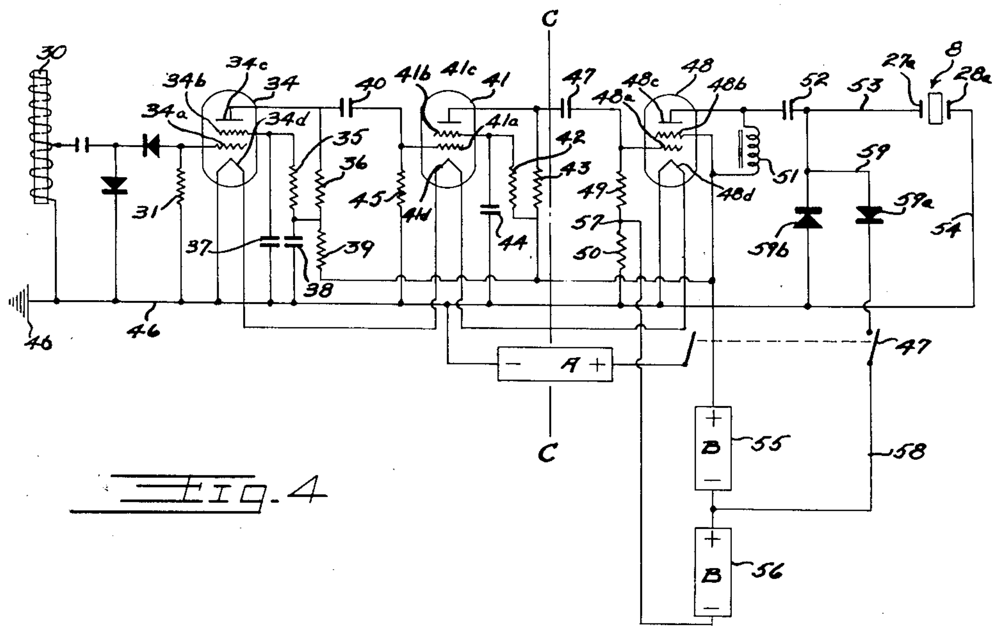
Fig. 4 is a schematic diagram of a circuit employed in the receiver of the present invention.

Referring now to Fig. 4, I have shown a typical control circuit for use with my novel crystal vibrated reed receiver. The control circuit includes three main portions, namely, a receiver, a voltage limiter and a decoder. The antenna 30 is constructed of a central core having a plurality of windings or coils encircling it. This novel antenna may be electrically lengthened by increasing the total number of coils on the center core. The antenna 30 receives the combination of radio-frequency carrier waves and audio-frequency signals carried by said wave and transmits them to grid 34*a* of amplifier tube 34 where the radio frequency is demodulated and the audio-frequency, so derived, is then amplified. Coil 31 is tuned by means of a variable capacitor to resonate at the desired radio frequency. Screen grid 34*b* is maintained at the correct voltage by means of resistor 35 which is by-passed by capacitor 37, the value of which is such as to pass the lowest frequency which is to be amplified.

Capacitor 38 with resistor 39 form a filter network. Resistor 36 connected to plate 34*c* will produce a voltage drop varying as the audio-frequency varies. This varying signal is coupled through capacitor 40 to grid 41*a* of amplifier tube 41 where it is further amplified. Resistor 45 connected from grid 41*a* to ground 46 provides bias for the tube. Screen grid 41*b* is maintained at the correct voltage by resistor 42 and is by-passed to ground by capacitor 44. Resistor 43 is connected to plate 41*c* and will produce a voltage drop varying as the audio-frequency varies. This varying signal is coupled through capacitor 47 to grid 48*a* of power tube 48 where it is further amplified. Resistors 49 and 50 connected from grid 48*a* to ground 46 provide bias for the tube by means of the current flowing from the batteries 55 and 56 through resistor 50 to the negative pole of said batteries. Screen grid 48*b* is connected directly to the batteries 55 and 56. An audio-frequency choke 51 is connected to plate 48*c* of power tube 48 and the voltage drop across this impedance will vary at the rate of the audio-frequency being amplified. Capacitor 52 couples the audio signal from choke 51 to crystal reed unit 8 through foil tabs 27*a* and 28*a*. The filaments 34*d* and 41*d* of tubes 34 and 41 respectively are connected in series between the A battery and ground 46. This arrangement causes grid 41*a* of tube 41 to become negative with respect to the filament 41*d* by the amount of the voltage drop across filament 34*d*. Filament 48*d* is connected between the A battery and ground 46 in the usual manner. One of said tabs 27*a* is connected by line 53 through condenser 52 to the midpoint between choke 51 and plate 48*c*, while the other tab 28*a* is connected to the ground 46 by line 54. Two B batteries 55 and 56 of 15 volts each, are connected in series between choke 51 and the midpoint between resistors 49 and 50 at 57. A tap line 58 is connected from line 53 through a switch 47 with a germanium diode 59*a*. A second diode 59*b* is connected between line 53 and ground 46. The diodes are connected by line 59. Batteries 55, 56 and germanium diodes 59*a* and 59*b* form a voltage limiter. Since the alternating current wave has equal peaks above and below zero voltage, one of the diodes 59*a* will be active in clipping off a peak portion of the sine wave and the other diode 59*b* will not conduct the wave until it overcomes the back voltage from the connection 58. This arrangement permits the voltage to rise at a rapid rate to 7½ volts where it is limited quickly at approximately 8 volts. If the receiver were located directly next to the antenna sending out the signal, through the use of the present voltage limiter the receiver would not be subjected to perhaps 30 volts but only to a maximum of 8 volts. With this arrangement, a crystal tuned to the next higher or lower frequency can be set to vibrate very slightly at 9 volts and when the voltage limiter comes into action, it will never receive more than 8 volts and, therefore, will not vibrate when it is undesirable. With this device, a signal of proper audio-resonance-frequency will cause the crystal 8 and reed 13 or 15, constructed in accordance with the device shown in Fig. 2, to vibrate causing the end of the reed to engage a signal cone 14 and thereby produce a humanly recognizable signal. It is obvious that with lever 18 omitted, the reed 13 vibrating at resonance will strike cone 14 when the parts are properly spaced, thus forming a single-reed device.

The use of the voltage limiter, as shown in Fig. 4, with the device of Figs. 1 and 2 has several important advantages, namely, (1) the reed can be made to give a proper response whether it is close to the antenna sending out the signal or a long way off; (2) it is possible to limit the response of a crystal to a signal of a certain peak voltage; and (3) it is possible to set various receivers at more closely spaced intervals.

Figure 5:
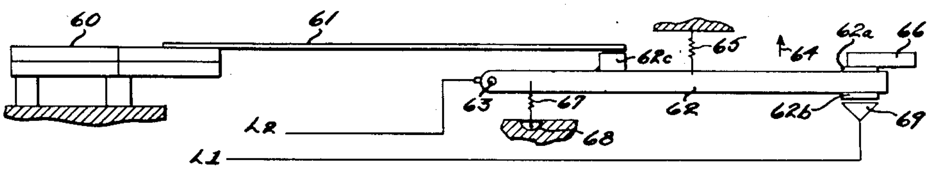
Fig. 5 is a side elevational view of a piezoelectric crystal vibrated reed employed as a relay switch for making and breaking contacts in a circuit.

Refer now to Fig. 5, wherein I have shown how the present invention may be utilized as a relay for general purposes. A piezoelectric crystal 60 constructed as shown in Fig. 2, is provided with a rigidly attached reed 61 to be vibrated by the free corner of the crystal in a manner similar to reed 13 previously described herein. A very light weight electrically conductive lever 62 pivotally mounted at 63, extends substantially parallel to but spaced from the reed 61. The lever 62 is biased in the direction of the arrow 64 by means of a light hair spring 65 so that contact 62*a* on the lever is normally held against a stop or contact 66. A damping device is provided for the lever 62 and is here shown as a stiff wire 67 which extends into a recess 68 which is filled with silicone or the like. The dash pot effect provided by the wire 67 in recess 68 is sufficient to cause the lever 62 to be moved very slowly. Another way of providing a damping effect would be to provide the pivot 63 with silicone or other sticky compounds which would act to retard the lever 62 as it pivoted at 63. The reed 61 is selectively resonant to a particular audio-frequency signal and upon receipt of such a signal by a crystal 60 in the position of crystal 8 in a circuit similar to Fig. 4, the reed is caused to vibrate. As the reed vibrates, it strikes a raised seat 62*c* on lever 62 and in a second or two drives the lever 62 downwardly where a second contact 62*b* on the lever engages a contact 69 provided in a relay circuit L1, L2 thereby energizing another circuit and causing a second desired operation to occur. As the lever 62 is driven downwardly by vibrating reed 61, the stiff wire 67 in recess 68 creates a dash-pot effect thereby holding the lever 62 for a selected period of time before returning to its initial position. During this period of time contact 62*b* on lever will be in engagement with the contact 69 of the relay circuit. Thus, through the provision of a crystal vibrated reed I have provided an extremely low powered, high impedance audio-frequency selective switch.

Figure 6:
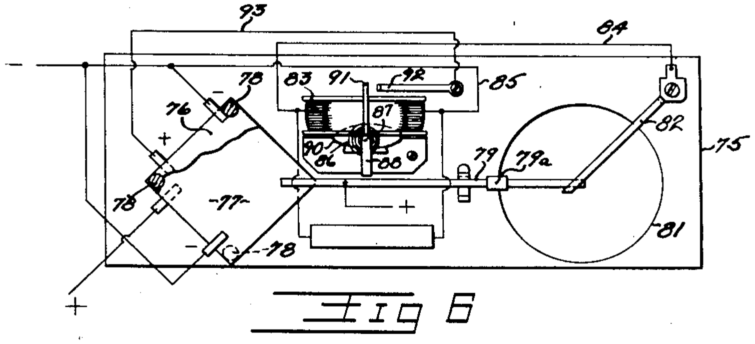
Fig. 6 is a top plan view of a modified form of a crystal vibrated reed signal receiving device.
Figure 7:
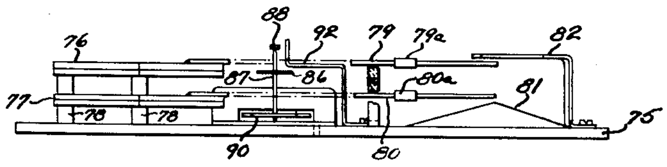
Fig. 7 is a side elevational view of the device of Fig. 6 with parts broken away to more clearly show the construction.

Referring now to Figs. 6 and 7 wherein I have shown a preferred embodiment of a two-reed receiver. The receiver unit is mounted in a small case of such size as to be capable of being carried around in the coat pocket of the user. Here the piezoelectric crystal receiver is constructed of two separate crystals 76 and 77 each constructed as described in connection with Fig. 2. The crystals are placed one above the other and are so arranged as to be completely independent of each other in their action. Each of the crystals 76 and 77 is constructed with four sides, three corners of which are rigidly mounted to the base 75 of the container by means of securing legs 78, leaving a fourth corner free to vibrate. Each of the crystals 76 and 77 is provided with a tuned reed 79 and 80 respectively, each of which is rigidly connected to the free corner of its respective crystal and projects outwardly, as seen in Figs. 6 and 7. The lower tuned reed 80 projects over a sounding cone 81 in such a manner as to provide a small air gap or space between the apex of the cone and the end of the reed. The upper tuned reed 79 extends outwardly substantially parallel to and in spaced alignment with reed 80. An electric contact member 82 is secured to the base 75 of the container and extends upwardly and outwardly to a position wherein its free end is spaced but a small distance from the end of the upper reed 79. An electrically wound coil 83 (Figs. 6 and 8) is positioned adjacent one edge of the container. The coil is connected to the electrical contact member 82 by means of line 84. Line 85 connects the other end of this coil with the negative poles of both piezoelectric crystal 76 and 77. Associated with the coil is a pivotally mounted shaft 87 which is vertically supported between the arms of a U-shape bracket member 88 which is secured to the base of the container. A transverse oscillating steel member 90 is rigidly secured to the lower end of the shaft 87 in the magnetic field of coil 83 and is caused to rotate in a clockwise direction as viewed in Fig. 6 upon energization of the coil 83. Rigidly secured to the upper end of the shaft 87 is an outstanding contact finger 91 which rotates in a clockwise direction along with the shaft 87 and member 90 upon energization of coil 83. A hair spring 86 connected between shaft 87 and a fixed point on the base causes the shaft 87 and its associated members to return to an inoperative neutral position, as shown in Fig. 6, upon deenergization of the coil 83. An upstanding contact member 92 is secured at one end to the base 75 of the container and has its free end positioned a small spaced distance from the end of finger 91 when said finger is in a neutral position, as seen in Fig. 6. The lower end of the contact member 92 is electrically connected to the lower piezoelectric crystal 77 by means of line 93.

The operation of the device should now be apparent. The present embodiment, as that of Fig. 1, is designed for use as a receiver responsive to two audio-frequency signals transmitted in sequence. Each of the reeds 79 and 80 is selectively resonant to a respective one of said audio-frequency signals. By providing each of the reeds with an adjustable weight 79*a* and 80*a* respectively the frequency at which the reeds becomes resonant may be altered. In effect, this is a method of lengthening or shortening the reeds.

A first signal having a resonant frequency of the upper reed 79 is received by the upper piezoelectric crystal 76 and causes the crystal to vibrate, which in turn transmits its motion to its associated reed 79. Since the reed is selectively resonant to this particular frequency, it begins to vibrate and its outermost end contacts the contact member 82. Immediately upon contacting the member 82, a circuit is established between the reed 79 and coil 83, and the coil becomes energized, and capacitor 104 connected acros the coil is energized to hold the charge briefly. Upon energization of coil 83, the oscillating member 90 is caused to pivot in a clockwise direction, toward the coil 83, as viewed in Fig. 6, which has the effect of rotating the contact finger 91 through shaft 87 in a clockwise direction, wherein it will contact member 92. A circuit is thereby completed through line 93 with the lower piezoelectric crystal 77. If during the period that the coil 83 is energized, which may be a few seconds, a second audio-frequency signal having the resonant frequency of reed 80 is received by the lower piezoelectric crystal 77, then reed 80 will be caused to vibrate. During its vibration, the end of reed 80 directly strikes or engages the sounding cone 81 and gives a characteristic tone or humanly recognizable signal. The advantage gained by increasing the number of vibrating reeds, as formerly explained, is found in an increased number of combinations of different signals that may be sent out from the transmitting equipment, thereby permitting an increase in the number of persons subject to individual call.

Figure 8:
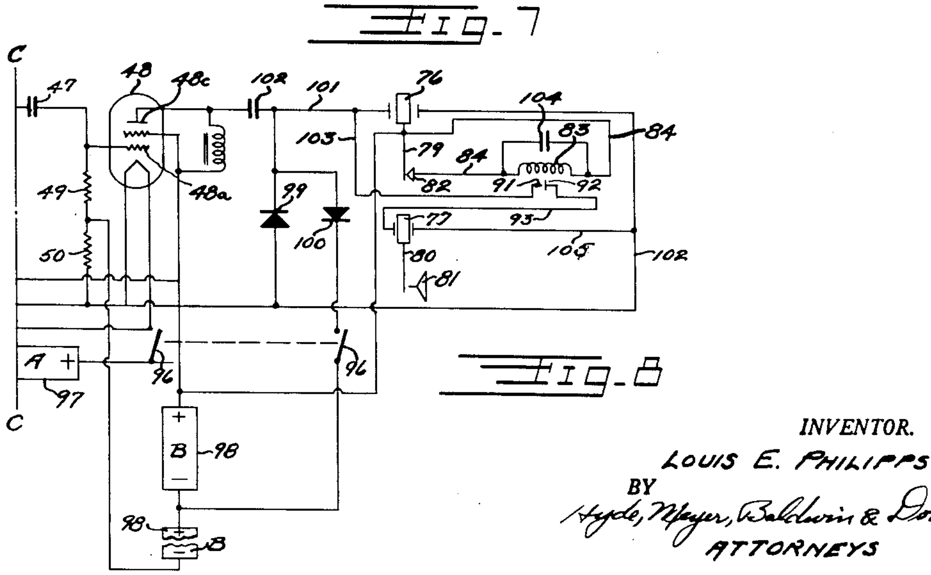
Fig. 8 is a schematic diagram of the decoder portion of the circuit employed in the device shown in Figs. 6 and 7.

Referring now to Fig. 8, I show a portion of the control circuit for use with the novel embodiment of the receiver shown in Figs. 6 and 7. The portion of the circuit shown in Fig. 6 relates to the decoder or that portion of the circuit, as seen in Fig. 4, which lies to the right of line C—C. The other portions of the circuit, namely, the receiver and voltage limiter are identical to those shown to the left of line C—C in Fig. 4. An A battery 97 provides power for the power tube 48 by means of a double-acting switch 96. A pair of B batteries 98 and 98 provide current for the germanium diodes 99 and 100. Power tube 48 and the germanium diodes are identical in their operation to those shown in Fig. 4. The grid 48c of the power tube 48 is connected by means of line 101 through capacitor 102 to the piezoelectric crystal 76 by means of suitable tabs on the crystal. Upon receipt of an audio-frequency signal through line 102 which is connected to the piezoelectrical crystal 76, the reed 79 vibrates and makes connection through contact 82 and line 84 with the coil 83 and capacitor 104. Upon energization of the coil 83 the hair spring controlled contact 91 closes a circuit through line 93 with the lower piezoelectric crystal 77. If during the period that the coil 83 is energized and current flows through lines 101 and 103 from power tube 48 to the piezoelectrical crystal 77, a second audio-frequency signal having the resonant frequency of reed 80 is received through lines 102 and 105 by the piezoelectrical crystal 77, then the reed 80 is caused to vibrate and directly strikes the sounding cone 81, to produce a characteristic tone or humanly recognizable signal.

Figure 9:
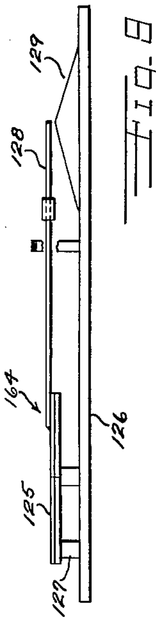
Fig. 9 is a side elevational view of a crystal and reed vibrating device for producing a signal on a loud speaker cone similar to Fig. 7 but utilizing only a single crystal and its attached vibrating reed.
Figure 10:
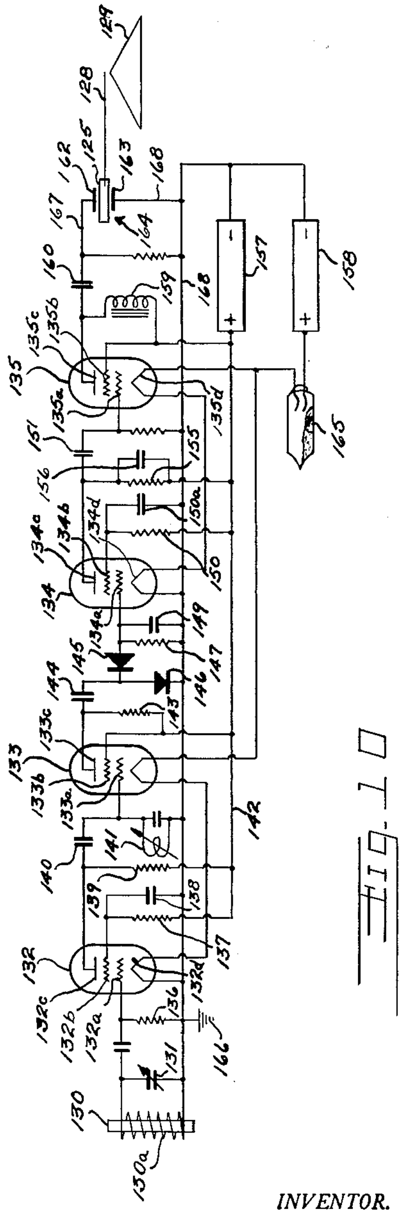
Fig. 10 is an electrical diagram similar to Fig. 4 but providing a control circuit for use in connection with a broadcasting loop which signals by means of pulses sent out on the loop and adapted to be detected by the electrical circuits of Fig. 10.

Refer now to Figs. 9 and 10 wherein I have shown another embodiment of the present invention. The novel receiver unit shown in Fig. 9 is mounted in a small case of such size as to be capable of being carried around in the pocket of the user. The piezoelectric crystal receiver is constructed of a single crystal 125 like that shown in Fig. 2 having four sides, three corners of which are rigidly mounted to the base 126 of the container by means of securing legs 127, which leaves the fourth corner free to vibrate. The crystal 125 is provided with a tuned reed 128 which is rigidly connected to the free corner of the crystal and projects outwardly as seen in Fig. 9. The length and mass of the reed is such as to vibrate in resonance at the desired cycles per second. The reed 128 projects over a sounding cone 129 in such a manner as to provide a small air gap or space between the apex of the cone and the end of the reed. In a single reed receiver such as this, shown in Fig. 9, the associated coil and oscillating members, such as shown in Fig. 7, are not required. This particular mechanism of Fig. 7 is needed only when a pair of associated reeds are used in connection with sequential signals during which time the coil 83 is energized by a first resonant frequency which energizes coil 83 and enables a second circuit, and thereafter upon receipt of a second resonant frequency during the predetermined energization of the coil 83, the second reed may be caused to vibrate to produce a signal, or otherwise to cause a desired result.

The receiver shown in Fig. 9 is to be actuated in a system employing a means of audio-induction. The area to be covered with a signal such as a hospital, factory or other location wherein such instruments are used, is encompassed by a wire loop, (not herein shown) both ends of which are connected to an audio-amplifier. A high audio-frequency signal preferably between 5000 and 20,000 cycles per second is pulsed into the wire loop and radiated magnetically into the air. The pulse rate produced may vary from about 100 to 500 pulses per second. The radiated signal is picked up by a typical control circuit, as seen in Fig. 10, which is adapted for use with the crystal vibrated reed receiver, shown in Fig. 9. The antenna 130 is constructed of a solid powdered iron core wrapped by coil 130*a* and is tuned to a particular number of cycles per second by means of variable condenser 131. The antenna transmits the audio-frequency signal thus received to grid 132*a* of amplifier tube 132 which together with tubes 133, 134 and 135 are filamentary type high gain voltage amplifier pentode tubes (type CK-6419 or equivalent). The audio-frequency, so derived in tube 132 is then amplified. Resistor 136 connected between the grid 132*a* of tube 132 and ground 166 provides the proper grid bias for said tube, as will be understood. Screen grid 132*b* is maintained at the correct voltage by means of a resistor 137 which is by-passed by a capacitor 138, the value of which is to pass the lowest frequency which is to be amplified. Resistor 139 connected to plate 132*c* of tube 132 will produce a voltage drop varying as the audio-frequency varies. This varying signal is coupled through capacitor 140 to tuner 141 wherein it undergoes further tuning. The signal upon leaving the tuner is transmitted to the grid 133*a* of amplifier tube 133 where it is further amplified. Screen grid 133*b* is connected to power line 142. Resistor 143 is connected to plate 133*c* and will produce a voltage drop varying as the audio-frequency varies. This varying signal is coupled through capacitor 144 to a pair of semi-conductor diodes 145 and 146 arranged as voltage doublers, with resistor 147 as the impedance load, and capacitor 149 as a filter. This arrangement produces the desired number of pulses per second of direct current on the grid 134*a* of tube 134. Screen grid 134*b* is connected directly to the power line 142 through a resistor 150 which maintains the voltage at a correct level at all times. The resistor 150 filters out the oscillations of the rectified audio-frequency signals. Plate 134*c* of amplifier tube 134 is connected to the grid 135*a* of tube 135 through capacitor 151. A resistor 155 and capacitor 156 bypass the capacitor 151 and provide additional filtering of the pulses received in tube 134. Amplifier tube 135 further amplifies the pulses transmitted from tube 134. Screen grid 135*b* is connected directly to the B battery 157. An audio-frequency choke 159 is connected to plate 135*c* of amplifier tube 135 and the voltage drop across this impedance will vary at the rate of the audio-frequency (pulse) being amplified. A capacitor 160 couples the signal from plate 135*c* and choke 159 to crystal-reed unit 164, which includes crystal 125 and reed 128, through suitable foil tabs 162 and 163. The filaments 132$d$, 133$d$, 134$d$ and 135$d$ of tubes 132, 133, 134 and 135 respectively are connected in series between the A battery 158 and ground 166 controlled by the mercury switch 165. Tab 162 is connected by line 167 to plate 135$c$ of tube 135 while the other tab 163 is connected to the ground 166 by line 168. The crystal 125 may be a "Twister Bimorph" like 8, mounted on three legs 127 and having the reed 128 rigidly connected at the free corner of the crystal as reed 13 was mounted. Foil tabs 162, 163 correspond to electrodes 27 and 28.

The A battery 158 having two filaments in series, provide 1.3 volts. The B battery 157 provides 15 volts. My device produces a very low drain on these batteries, being about 20 milliamperes on battery 157.

The diodes 145 and 146 form a voltage limiter and since the alternating current waves have equal peaks above and below zero voltage, one of the diodes will be active in clipping off a peak portion of the sine wave and the other diode will not conduct the wave until it overcomes the back voltage from the connection with the line 168.

If the amplified pulses received by the crystal 125, are of a frequency that coincides with the resonant frequency of the reed 128, the reed will be caused to vibrate and strike the sounding cone 129 and thereby produce an audible sound. At any other frequency (other than that for which the reed is tuned) the reed will not be caused to vibrate and therefore will not strike the sounding cone and no sound will result.

The operation of the circuit and associated crystal vibrated reed receiver should now be apparent. Assume that a signal having a radiated frequency of 10,000 cycles per second and a pulse rate of 200 pulses per second is being pulsed into the wire loop heretofore mentioned. Preferably the "off" time between pulses approximately equals the "on" time of a pulse. Therefore, a pulse would equal about 25 waves at the 10,000 c.p.s. rate, succeeded by an "off" period of an equal time period, followed by a second pulse of 25 cycle waves, etc. The receiver picks up this radiated signal in its powdered iron core antenna 130 which is tuned to 10,000 cycles per second by means of tuned capacitance 131. The signal is amplified by filamentary type high gain voltage amplifier pentode tubes 132 and 133 with tuner 141 being tuned to 10,000 cycles per second and furnishing additional selectivity. The twin diodes 145 and 146 are semi-conductor diodes arranged as voltage doublers, with 147 the load and 149 the filter, and cause the alternating current to be changed to direct current, thereby producing 200 pulses per second of direct current on the grid 134$a$ of amplifier tube 134. Amplifier tube 134 amplifies the pulses of direct current received from twin diodes 145 and 146 while resistor 150 filters out the oscillations and transmits a smooth curve of pulses of direct current. Amplifier tube 135 further amplifies the pulses of direct current and delivers them to the crystal vibrated reed receiver 164 which, upon receipt of amplified pulses of direct current having a frequency that coincides with the resonant frequency of the reed 128, will cause the reed to vibrate and strike the sounding cone to produce an audible sound.

It will be understood that the present system illustrated in Figs. 9 and 10 may also employ a multiple reed receiver responsive to receipt of two pulse frequencies in series during a predetermined period, as described in connection with Figs. 6–8.

Figure 11:
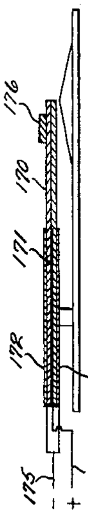
Fig. 11 is a side elevational view similar to Fig. 9 and showing an elongated ceramic crystal which vibrates like a reed and is adapted to take the place of the crystal plus reed of Fig. 9.

Fig. 11 shows a receiver and signalling unit similar to Fig. 9 and which may be substituted in the circuit of Fig. 10 to produce a similar result. Fig. 11 shows an elongated ceramic crystal, one form of which is made of laminated plates of barium titanate, which are electrically polarized while being baked to their final form. The raw material for this ceramic crystal is extruded in forming the elongated strip, in such a way as to leave small holes extending through the laminated plates which are filled with graphite to form a center electrode 171. In the finished crystal, the two outside faces are silvered and electrodes 172 and 173 are attached there. Such a ceramic crystal in one form is about three-eighths inch wide and one or two inches long and approximately one-eighth inch thick. It will vibrate like a reed when the resonant frequency is applied between the leads 174 and 175. The crystal may be tuned to a desired frequency by attaching a mass 176 at or near the end thereof. Such a ceramic crystal has a very high resistance to change due to temperature and humidity. It should be understood that the ceramic crystal 170 of Fig. 11 may be substituted for the crystal 125 and the attached reed 128 of Figs. 9 and 10. In Fig. 10, the leads 174 and 175 are connected in the circuit in place of the electrodes 162 and 163.

This is a continuation-in-part of the application for Crystal Vibrated Reed and Receiver, Serial No. 575,021, filed March 30, 1956 for Louis E. Philipps.

Having thus described my invention and illustrated its use, what I claim as new and desire to secure by Letters Patent is:

1. A crystal controlled personal signal receiver comprising a piezoelectric crystal, said crystal constructed of two layers, said crystal caused to vibrate upon receipt of an audio-frequency signal, one corner of said crystal being free to vibrate, the remainder being rigidly supported, a reed operatively connected with the free corner of said crystal, said reed being selectively resonant to a particular audio-frequency signal received by said crystal, a speaker cone positioned proximate the free end of said reed, said crystal causing said reed to vibrate upon receipt of the proper resonant frequency signal, said vibrating reed directly striking said speaker cone and producing a characteristic humanly recognizable signal, an electrical circuit containing said crystal for energization by said circuit, said circuit containing voltage limiter means, said voltage limiter means permitting the voltage in said circuit to rise rapidly to a predetermined limit and then quickly limit said voltage at said predetermined limit.

2. A crystal controlled personal signal receiver comprising a piezoelectric crystal constructed of two layers bendable by electrical energization of said crystal by electrical impulses of predetermined frequency, means firmly holding said crystal leaving a corner thereof free to vibrate, the remainder thereof being rigidly supported, said crystal caused to vibrate upon receipt of an audio-frequency signal, two reeds operatively connected with said free portion of said crystal for vibrations thereby, said reeds respectively having different resonant periods of vibration at frequencies to which said crystal is responsive, a speaker cone positioned approximate the free end of one of said reeds, said crystal causing said one reed to vibrate upon receipt of the proper resonant frequency signal, said one reed directly striking said speaker cone and producing a characteristic humanly recognizable signal, an electrical circuit containing said crystal for energization by said circuit, said circuit containing voltage limiter means, said voltage limiter means permitting the voltage in said circuit to rise rapidly to a predetermined limit and then quickly limit said voltage at said predetermined limit, and interlocking means operatively connected between said reeds preventing vibration of said one reed until the vibration of the other of said reeds has been effected in response to said crystal being vibrated by a signal characteristic of the resonant frequency of said other reed.

3. A crystal controlled personal signal receiver comprising a pair of reeds each respectively tuned to a different audio frequency signal, the first of said reeds being secured to a piezoelectric crystal, said crystal being constructed of two layers, one corner of said crystal being free to vibrate upon receiving an audio frequency signal, said first reed being connected to said one corner of said crystal the remainder of said crystal being rigidly supported, the second of said reeds being positioned adjacent said crystal, a connecting arm secured to said crystal and engaging said second reed, a lever operatively connected between said first and second reed, one end of said lever releasably engaging said first reed so as to prevent it from vibrating in response to vibration of said crystal, the other end of said lever arm being operatively connected with second reed, said second reed being vibratable by said crystal through said connecting arm when said crystal receives a signal having the resonant frequency of said second reed, vibration of said second reed causing said lever to pivot and release the said first reed, means for maintaining said lever free from said first reed for a limited period of time, said first reed being caused to vibrate if during said limited time period a sequential audio frequency signal having the resonant frequency of said first reed is received by said crystal, a speaker cone positioned approximate the free end of said first reed, said first reed directly striking said speaker cone and producing a characteristic humanly recognizable signal, an electrical circuit containing said crystal for energization by said circuit containing voltage limiter means, said voltage limiter means permitting the voltage in said circuit to rise rapidly to a predetermined limit in response to receiving said signals and then quickly limit said voltage at said predetermined limit.

4. A crystal controlled personal signal receiver comprising a pair of reeds each respectively tuned to a different audio frequency signal, a first of said reeds secured to one corner of a piezoelectric crystal, said one corner being thus free to vibrate the remainder of said crystal being rigidly supported, said crystal constructed of two layers and caused to vibrate upon receiving an audio frequency signal, a second reed positioned adjacent said crystal, a lever between said first and second reeds, one end of said lever releasably engaging said first reed and operable to prevent it from vibrating in response to vibration of said crystal, the other end of said lever being operatively connected to said second reed, means causing said second reed to be vibrated by said crystal when said crystal receives a signal having the resonant frequency of said second reed, vibration of said second reed causing said lever to release said first reed, means for maintaining said lever free from said first reed for a predetermined period of time, said first reed being caused to vibrate if during said time period an audio frequency signal having the resonant frequency of said first reed is sequentially received by said crystal, a speaker cone positioned approximate the free end of said first reed, said first reed directly striking said speaker cone and producing a characteristic humanly recognizable signal, an electrical circuit containing said crystal for energization by said circuit, said circuit containing voltage limiter means, said voltage limiter means permitting the voltage in said circuit to rise rapidly to a predetermined limit in response to said circuit sequentially receiving signals having the resonant frequencies of said first and second reeds and then quickly limit said voltage at said predetermined limit.

5. A crystal controlled personal signal receiver comprising a piezoelectric crystal, said crystal constructed of two generally rectangular laminations of Rochelle salt crystals, said salt crystals of each laminate extending at an angle to each other, a first sheet of foil provided on the upper surface of the bottom laminate, a second sheet of foil provided on the bottom surface of the top laminate, said sheets of foil being positioned one on top of the other in the final crystal assembly, at least one tab provided on said sheets of foil, said tab extending beyond the periphery of said crystal, a third sheet of foil provided on the top surface of the top laminate, said sheet extending around one end of the crystal and continued across the bottom surface of the lower laminate, said third sheet of foil provided with a tab extending beyond the periphery of said crystal, said tabs providing means for said crystal to receive audio frequency signals, said crystal being caused to vibrate upon receipt of such signal, one corner of said crystal being free to vibrate, the remainder being rigidly supported, a reed operatively connected with the free corner of said crystal, said reed being selectively resonant to a particular audio frequency signal received by said crystal, a speaker cone positioned approximate the free end of said reed, said crystal causing said reed to vibrate upon receipt of the proper resonant frequency signal, said vibrating reed directly striking said speaker cone and producting a characteristic humanly recognizable signal, an electrical circuit containing said crystal for energization by said circuit, said circuit containing voltage limiter means, said voltage limiter means permitting the voltage in said circuit to rise rapidly to a predetermined limit and then quickly limit said voltage at said predetermined limit.

6. A crystal controlled personal signal receiver comprising a pair of spaced reeds responsive respectively to different audio frequency signals, the first of said reeds being secured to a piezoelectric crystal, said crystal being constructed of two layers, one corner of said crystal being free to vibrate upon receiving an audio frequency signal, said first reed being connected to one corner of said crystal, the remainder of said crystal being rigidly supported, the second of said reeds being operatively connected with said piezoelectric crystal, a sounding cone positioned proximate the free end of said first reed, a pivoted lever having one end spring biased into engagement with said first reed so as to render it normally inoperative, the other end of said lever being in engagement with said second reed, said second reed being vibrated by said crystal when said crystal receives an audio frequency signal having a resonant frequency of said second reed, vibration of said second reed causing said lever to release said first reed, means for maintaining said lever free from said first reed for a limited period of time, said first reed being vibrated by said crystal if during said limited period of time said crystal receives an audio frequency signal having a resonant frequency of said first reed, vibration of said first reed causing said reed to strike said sounding cone and produce a characteristic humanly recognizable signal, an electrical circuit containing said crystal for energization by said audio frequency signals, said circuit containing voltage limiter means, said voltage limiter means comprising a pair of batteries in series, a pair of germanium diodes in series and connected between said batteries, wherein the voltage may rise rapidly to 7½ volts and then quickly be limited at approximately 8 volts, said voltage limiter means being operable in response to said circuit receiving said signals to permit the voltage in said circuit to rise rapidly to a predetermined limit and then quickly limit said voltage at said limit.

References Cited in the file of this patent

UNITED STATES PATENTS

| | | |
|---|---|---|
| 887,357 | Stubblefield | May 12, 1908 |
| 1,461,568 | Adams-Randall | July 10, 1923 |
| 1,831,829 | Thomas | Nov. 17, 1931 |
| 1,920,655 | Michelssen | Aug. 1, 1933 |
| 2,033,631 | Gruetzmacher | Mar. 10, 1936 |
| 2,105,011 | Williams | Jan. 11, 1938 |
| 2,185,966 | Pfanstiehl | Jan. 2, 1940 |
| 2,340,798 | Deal | Feb. 1, 1944 |
| 2,365,738 | Williams | Dec. 26, 1944 |
| 2,387,108 | Arndt et al. | Oct. 16, 1945 |
| 2,388,531 | Deal | Nov. 6, 1945 |
| 2,714,859 | Klemme | Aug. 9, 1955 |